Dec. 13, 1932.                G. A. NEWHOUSE                1,890,621
                            CULTIVATING IMPLEMENT
                           Filed June 22, 1932        2 Sheets-Sheet 1

INVENTOR
GEORGE A. NEWHOUSE
ATTORNEY

Dec. 13, 1932.   G. A. NEWHOUSE   1,890,621
CULTIVATING IMPLEMENT
Filed June 22, 1932   2 Sheets-Sheet 2
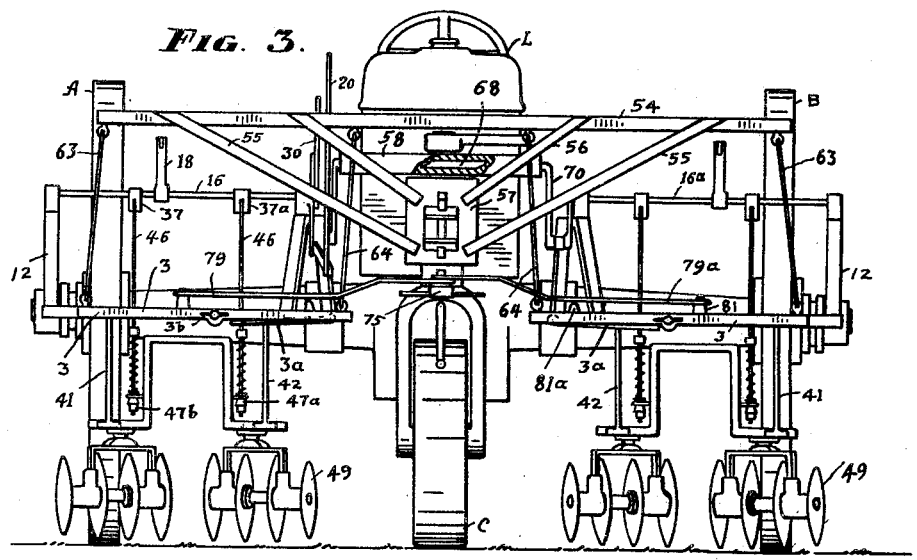
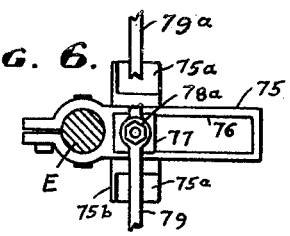
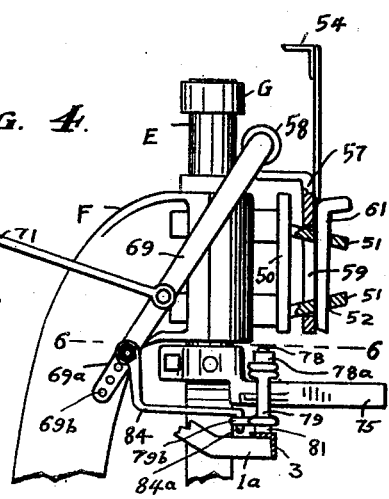
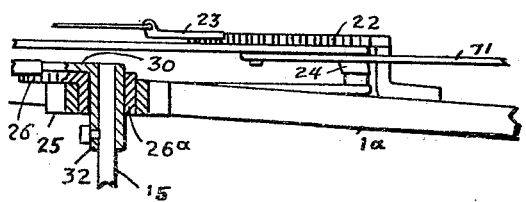
INVENTOR
GEORGE A. NEWHOUSE
ATTORNEY.

Patented Dec. 13, 1932

1,890,621

UNITED STATES PATENT OFFICE

GEORGE A. NEWHOUSE, OF YORKTOWN, INDIANA

CULTIVATING IMPLEMENT

Application filed June 22, 1932. Serial No. 618,794.

This invention relates to improvements in soil cultivating implements.

In the operating of implements embodying cultivator tools such as plows, shovels, and the like, it is desirable that the tools may be observable at all times by the operator, and also that the direction of travel of the tools with regard to the trend of the direction of the plants in the field row, may be positively controlled. Other advantages to be desired are, that the drive of the tools may be positive and dependable, and that the tools may be easily raised from, or lowered to, their operative positions. Still further benefits sought for are, that the tool carrying and manipulating means may be easily attached to, and as easily detached from the wheeled vehicle by which they are drawn. A vehicle of the type preferred, and in connection with which my invention is shown, is a tractor.

The above named objects, as well as other and more specific purposes which will become apparent as the description of my invention proceeds, are accomplished by, and the invention is embodied in the new construction, combination and arrangement of parts shown in the annexed drawings, and described in the following specification. The invention is defined in the appended claims.

The several parts of the invention are identified by suitable characters of reference applied to them in the different views in the drawings, in which—

Figure 3 is a front view, taken in the direction of arrow 3 in Figure 1.

Figure 4 is a detached enlarged view of the hand operable means for raising and lowering the gang frames.

Figure 5 is a top plan view taken on the line 5—5 in Figure 4.

Figure 6 is a sectional top plan view of the power arm 75 and its connected parts, taken on the line 6—6 in Figure 4, a portion of the arm rod 79a being broken away.

My invention broadly stated, consists of the combination with a power driven vehicle which is capable of being steered by the operator, said vehicle being referred to hereinafter, as a tractor, of a draft frame at each side of the tractor each having its rear end connected to a fixed part of the tractor, a transverse carrier frame attached to the head structure of the tractor, support members between the carrier frame and the forward end of each of the draft frames, gang frames beneath the draft frames, draft connections between the gang frames and the frontal portions of the said draft frames, tools on the gang frames, hand operable means on the draft frames to raise and lower the gang frames, a power arm on the guide-wheel column of the tractor, a cross head retained on, and which is movable longitudinally of said power arm, arm rods between the said cross head and the forward ends of the draft frames, and connections between said hand operable means and the said arm rods, whereby the said cross head is moved to and is retained at projected position when the gang frames are lowered, and is retained at retracted position when the gang frames are raised.

Figure 1:
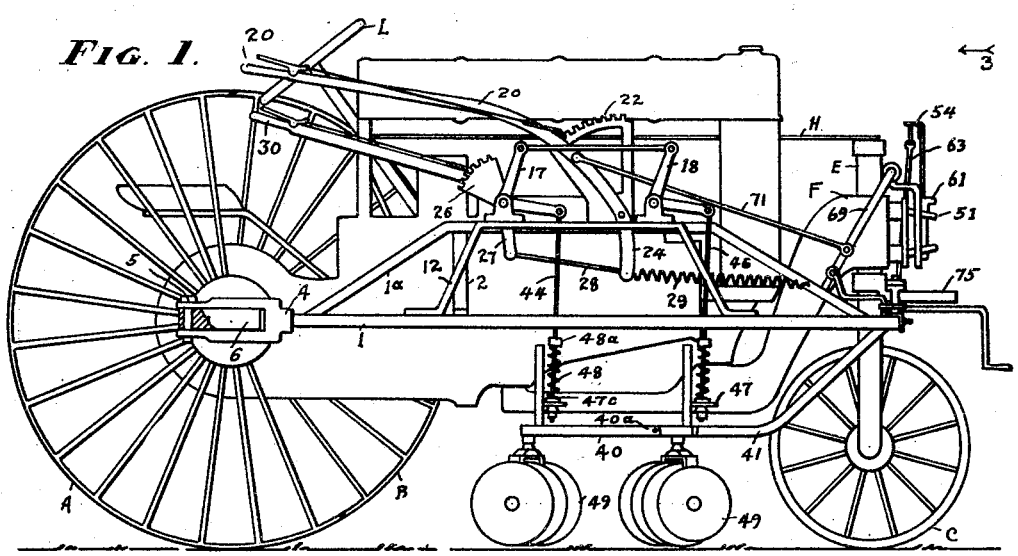
Figure 1 is a side view of my improved cultivating apparatus, portions of the vehicle drive wheels being broken away.
Figure 2:
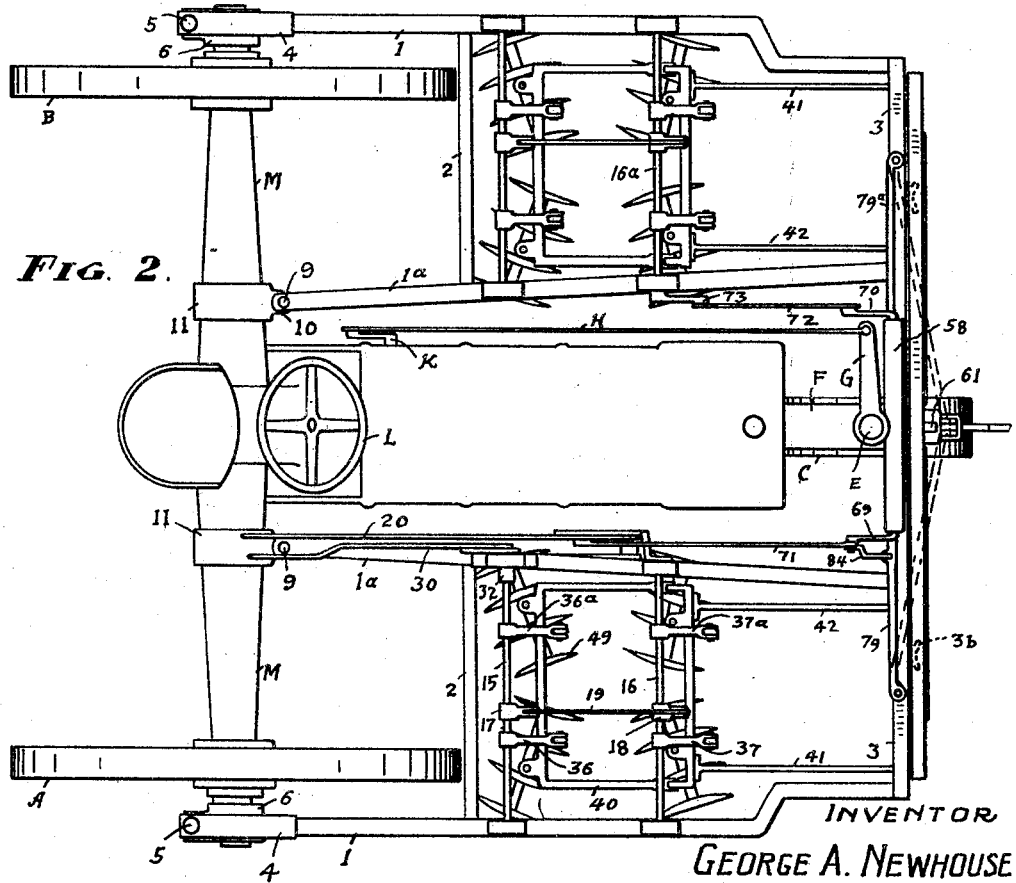
Figure 2 is a top plan view of Figure 1.

The invention is adapted to be easily attached to, and as easily detached from, a tractor of standard type, having the usual drive wheels A and B, guide wheel C, and its column E which is operable oscillatively in the head structure F, through suitable connections G, H, and K, by the steering wheel L. The invention being intended for use in cultivating crop rows of maximum width, the rear axle housings M are of elongated formation as shown in Figure 2.

The said draft frames are similar. Each consists of an outer bar 1 and an inner bar 1a retained in spaced relation by a stay bar 2, and whose spaced frontal ends are fastened to a cross bar 3. Each of the said cross bars 3 is provided with a folding leg 3a which is retained normally in the inoperative or raised status, as shown in Figure 3, by a wing nut set screw 3b. The said outer bar 1 is provided at its rear end with a fitting 4, which is attached by a removable connector pin 5 to a hub fitting 6 that is swiveled on the hub of the drive wheel. The inner bar 1a has its rear end attached by a removable connector pin 9 to a lug 10 of a fitting 11 which is secured to the axle housing M. On a riser 12 which is secured to the outer bar 1, and to the top portion of the inner bar 1a are secured suitable pillow blocks in which are journaled shafts 15 and 16. Secured to said shafts are arms 17 and 18. Between these arms, is a connecting rod 19. A hand lever 20 which is pivoted at 21, and is retained by a suitable sector 22, and latch connections 23, has the arm 24. Journaled on the pillow block 25, is a hubbed sector 26 having an integrally formed arm 27. Between this arm 27 and the arm 24 of lever 20, is a connecting rod 28. Between the arm 24 and frame bar 1a is arranged a contractile spring 29 which minimizes the amount of exertion required to handle the lever 20.

A hand lever 30 has a right angle wrist 32 which is journaled in the hub 26a of the sector 26, and it is secured to the shaft 15. The said lever has suitable latch connection 33 with the said sector 26. By the arrangement just described, it is obvious that by the moving of lever 20, there is the movement of sector 26, lever 30 and shaft 15, and which through arm 17, connecting rod 19, and arm 18, moves shaft 16. Secured to the shafts 15 and 16 are the arms 36, 37, 36a and 37a. (See Figure 2.)

Beneath each of the draft frames is a gang frame 40, whose draw bars 41 and 42 are pivotally attached to the cross bar 3 of the said draft frame. A gang frame of desirable type embodies a forward portion and a rearward portion, hingedly or flexibly connected, as at 40a, a frame of this kind being illustrated in detail in Letters Patent granted to me September 27, 1927, numbered 1,643,898. Rods 44 and 46, whose upper ends are loosely connected to the arms 36, 36a, 37, and 37a have their lower ends passed through support clips 47 of said gang frame. A washer 47a loose on each rod, underneath the clip, is retained by a nut 47b. Loose on said rod, and above the clip, is a seat ring 47c in which is seated a coil spring 48. The upper end of said spring has engagement with a collar 48a which is retained on said rod by a set screw. Carried by the gang frame, are cultivating tools, such as the disks 49.

The gang frame may be raised and lowered by the manipulating of the hand lever 20. The function of lever 30 is to raise and to lower, and to retain in either the raised or lowered position, the right hand gang frame, said position being one of adjustment with reference to the position of the left hand gang frame. Further reference to this lever 30 will presently be made.

Secured to the head structure F of the tractor, is a head plate 50 projecting from which are convergent tongues 51 each of which has an aperture 52. A transverse carrier frame consists of a cross bar 54 of suitable length as shown plainly in Figure 3. Secured to said cross bar by stay members 55 and 56, in central position, is a stout head plate 57. Integrated with this head plate 57 is an elongated boxing 58 whose function will be presently referred to. The said head plate is provided with a rectangular opening 59 through which the convergent tongues 51 of the plate 50 protrude (see Figure 4). Through the apertures 52 of said tongues, a retained pin 61 is passed, whereby the plate 57 is retained securely, and the carrier frame is supported stably in its position, as shown in Figure 3.

By links 63 and 64 which depend loosely from said cross bar 54, and which are loosely connected to the cross bars 3 and 3 of the draft frames, the latter are supported. Thus they are capable of being swung from right to left, and vice versa. Raising and lowering, and the holding of the left hand gang frame in raised or lowered position, is provided for by the parts as follows. Journaled in the boxing 58 is a shaft 68 having the arms 69 and 70. Connecting rod 71 extends from the lever 20 to the arm 69; and a connecting rod 72 extends from arm 70 to an arm 73 on shaft 16a of the left hand side of the machine.

Secured to the steering column E, and in alignment with the guide wheel C of the tractor, is a power arm 75. It is provided with a guideway 76 in which is movably retained a cross head 77. Arm rods 79 and 79a whose outer ends are pivotally connected to studs 81 provided therefor on the cross bars 3 and 3, have their proximate ends disposed on the said cross head 77 and engaged with a wrist pin stud 78. On this stud 78 is a cap nut 78a. Projecting from the sides of power arm 75 are seat plates each being formed to constitute a seat 75a and having a raised edge 75b. The function of these seats 75a will be presently referred to. A connector member 84 which is pivotally connected to the end 69a of arm 69, has its forward end 84a loosely connected to the eyelet 79b of arm rod 79.

With the raising of lever 20, and incidentally the lowering of the tools 49, there is the shifting of cross head 77 to projected position. By the turning of the column E there is the shifting of the draft frames accordingly. The measure of said shifting movement is varied by connecting the member 84 at the desired one of the several holes 69b in arm 69.

The maximum swing of the draft frames is had when the cross head 77 is at the extreme projected position in its guideway 76, as indicated by the broken lines in Figure 2. At such time as the cross head 77 is at the completely retracted position, the effect of the oscillatory movement of the steering column E upon the draft frames is negligible.

Whereas I have shown the gang frames fitted with disk plows, it will be understood that frames of modified form, and adapted to accommodate tools of various kinds may be used.

In readiness to operate, the machine, and the positions of its several parts, appear as shown in the drawings, the gang frames being in the raised position.

The machine having traveled to the field, the lever 20 is operated (raised), the gang frames being thereby lowered. To properly co-ordinate said gang frames as to heights, the lever 30 is used. The sector 26 being held immovable by reason of the tools of gang frame (left hand) being on the ground, the lever 30 after having obtained the desired height for the right hand gang frame, is latched at position.

As the tractor proceeds and is steered by the operator, the inside rows, (and which are easily observable by the operator) need only be watched. The forward ends of the draft frames, and the gang frames, being moved to right or left coincidentally with the movement to right or left of the guide wheel, the line of travel of the tools is dependable. The operator is therefore enabled to cause the tools to follow a line of travel dictated by the steering of the guide wheel.

In the lowering of lever 20 the gang frames are raised, and the cross head 77 is retracted. In this retractive movement of said cross head 77, it is drawn back to position so near the center of the column E (see Figure 6), that the action of the arm 75 tending to shift the draft frames, is negligible, thereby permitting the full turning movement of the column E.

Whereas the frontal ends of the gang frames are attached to the frontal ends of the draft frames, the power of propulsion of the gang frames passes from the rear axle of the tractor through the members of the draft frames. There being power transmitting connections between the guide wheel column E, and the frontal portions of the draft frames, the frontal ends of said frames are caused to move transversely, coordinately with the oscillatory movement of the steering column. By this arrangement there is, coincidentally with the turn of the guide wheel to right or left, the swing of the draft frames and tools to right or left. By reason of being able to lift either one or both of the gang frames, the operator may cultivate either one or both rows continuously, and may intermittently cultivate either one or both of the rows.

Features of my invention are those whereby the operator is enabled to detach the tractor quickly, and relatively easily. Preliminary to detaching the tractor, the tools are in the raised position, as shown in the drawings.

To detach the tractor, the several steps are as follows: Cap nut 78a is removed, and the arm rods 79 and 79a are disconnected from the cross head stud 78 and are urged in opposite directions and their proximate ends are reposed on the seats 75a of the power arm 75. By this placing of the arm rods, the gang frames are held apart a suitable distance to assure clearance of the lower portions of the tractor structure and the tools. Also the arm rods are supported while in the detached status, by the chairs 81a that are provided on the tops of the cross bars 3. Then by loosening the wing nuts 3b, the legs 3a are unfolded so that same occupy a vertical position. Lever 20 is then raised, thereby lowering the disks 49 to the ground, the weight of the superposed parts of the machine now rests upon the rods 44 and 46. The frontal portion of the structure is stayed by the legs 3a. Connector pins 5, and 9, are then removed from the fitting 4 and lug 10, respectively. Retainer pin 61 is then removed from the tongues 51.

The implement structure in its entirety, is now in status disconnected from the tractor. The tractor may now be backed. In the operating of the tractor rearwardly, the hub fittings 6 and the lugs 10 leave the fittings 4, and the rear ends of frame member 1a, respectively. The seats 75a of the power arm 75 pass from their positions underneath the ends of the arm rods 79 and 79a, and the tongues 51 leave the recess 59. The carrier frame swings forward a short distance, the shaft 68 acting as a pivot or hinge. The arms 69 and 70, and connecting rods 71 and 72 act to retain the carrier frame at the semi-upright position while it is in the status just described.

At this stage the implement may rest in the status described until it is again desired to attach the tractor.

Connecting the tractor with the implement, consists in simply driving the tractor to position between the draft frames, and then connecting the rear ends of the draft frames, by disposing the connector pins 5 and 9 in place. Arm rods 79 and 79a are then placed in position, their proximate ends being engaged with the stud 78 and the cap nut 78a being applied. The carrier frame is then moved to its upright position, head plate 57 coming to registration with the head plate 50, and the tongues 51 then protruding through the head plate 57, as shown in Figure 4. With the making fast in its position, of the slightly tapered retainer pin 61, the attachment of the implement to the tractor will have been completed.

Legs 3a may now be folded to position on the undersides of the cross bars 3 and 3, and there secured by tightening the wing nuts 3b, as shown in Figure 3. Then with the lowering of the lever 20 there is the raising of the gang frames and tools, and the machine is in readiness to be driven into the field. The driving power being derived from the axle housing and rear portion of the tractor, being transmitted directly through the longitudinal members of the draft frames, to the draw bars to which the gang frames are attached, the drive of the tools is positive and powerful and efficient. At the same time, the strains carried by the frontal portions of the implement structure are comparatively light. For the above reasons, the invention lends itself to extreme economy in manufacture, both as to the amount of materials required, and as to the nature of the mechanical work necessary in the processing of the several parts.

It will be understood also that the apparatus lends itself readily to the accommodation of tools of different kinds, also to the use of gang frames of various widths, and disposed at various distances apart.

In operating the invention, the direction of travel of the tools is instantly affected, as the direction of movement of the guide wheel changes. Accordingly there is the desired quick dodging action of the tools. The operator is enabled to cultivate rapidly and effectively, and to practically avoid injury to the plants. Handling of the machine is simple and readily understood, and the attaching of the implement to, and the detaching of it from the tractor requires a very small amount of time, and it involves the exercise of only ordinary skill.

Whereas in the embodiment of my invention as it is described and illustrated herein, I have shown what I consider as practicable details and features of construction, I wish it to be understood, that I am not to be limited to the precise construction shown, and that within the scope of the invention as it is defined in the appended claims, modifications in the machine may be made, without departing from the spirit or essence of the invention.

What I claim as my invention, is—

1. In agricultural apparatus of the kind described, the combination with a tractor, of a head member therefor at its forward end, a transverse carrier frame secured to said head member, a draft frame at each side of the tractor and having its rear end pivotally connected to a fixed part of the tractor, gang tools drawn by the draft frames, support members between the carrier frame and the front ends of the draft frames, connections between the steering gear of the tractor and the front ends of the draft frames whereby there is a shift of the front ends of the draft frames transversely coincidentally with the movement of the steering gear, and hand operable means to move the gang tools to, and to retain them in either the raised or the lowered position.

2. In combination with a tractor, a draft frame at each side of the tractor, each having its rear end pivotally connected to the tractor frame, a carrier frame attached to the tractor at its forward end, flexible support connections between the said carrier frame and the forward ends of said draft frames, and connections between the steering mechanism of the tractor and the forward portions of the draft frames whereby the latter are caused to move to right or left coincidentally with the movement right or left of the steering mechanism.

3. In combination with a tractor, a draft frame at each side of the tractor, and having its rear end connected to the rear axle housings, a carrier frame attached to the tractor, flexible support connections between the said carrier frame and the forward ends of the draft frames, gang frames drawn by the draft frames, hand operable means to raise and lower, and to retain in raised and lowered position, the said gang frames, hand operable means to raise and lower one of the gang frames independently of the other, connections between the steering mechanism of the tractor and the forward portions of the draft frames whereby the latter are caused to move to right or left coincidentally with the movement right or left of the guide wheel, and means to render said connections inoperative when the gang frames are in the raised position.

4. In combination with a power driven vehicle which is capable of being steered by the operator, a draft frame at each side of the center of the vehicle and having its rear end secured to a fixed part of the vehicle, a carrier frame at the frontal portion of the vehicle, flexible supports between the carrier frame and the frontal ends of the draft frames, gang frames and tools, draw bars between the gang frames and the frontal ends of the draft frames, hand operable means to raise and lower the gang frames and to retain them in raised and lowered position, and means operable by the operator to sway the front ends of the draft frames from right to left and vice versa.

In testimony whereof I affix my signature.

GEORGE A. NEWHOUSE.